United States Patent
Stancu et al.

(10) Patent No.: US 7,756,669 B2
(45) Date of Patent: Jul. 13, 2010

(54) SYSTEMS AND METHODS FOR ESTIMATING TEMPERATURES OF POWER MODULE COMPONENTS

(75) Inventors: Constantin C. Stancu, Torrance, CA (US); Robert T. Dawsey, Torrance, CA (US); Brian A. Welchko, Torrance, CA (US)

(73) Assignee: GM Global Technology Operations, Inc., Detroit, MI (US)

(*) Notice: Subject to any disclaimer, the term of this patent is extended or adjusted under 35 U.S.C. 154(b) by 204 days.

(21) Appl. No.: 12/141,653

(22) Filed: Jun. 18, 2008

(65) Prior Publication Data

US 2009/0319115 A1 Dec. 24, 2009

(51) Int. Cl.
G01K 1/08 (2006.01)
G01N 27/416 (2006.01)
(52) U.S. Cl. .................. 702/132; 324/431
(58) Field of Classification Search .............. 702/132; 320/150, 153; 324/431
See application file for complete search history.

(56) References Cited

U.S. PATENT DOCUMENTS 7,652,587 B2 * 1/2010 Hohn et al. ............... 340/682
2009/0115491 A1 * 5/2009 Anwar et al. ............. 327/512

\* cited by examiner

*Primary Examiner*—Edward Tso
*Assistant Examiner*—Richard V Muralidar
(74) *Attorney, Agent, or Firm*—Ingrassia Fisher & Lorenz, P.C.

(57) ABSTRACT

Methods and systems are provided for modeling temperature characteristics of components in a system such as a power module for a hybrid or electric vehicle. A power dissipation value is calculated for each of the components in the system. A first filter is applied to the power dissipation value associated with a selected component to determine its estimated temperature. For each of the neighboring components located adjacent to the selected component, a cross-coupling temperature is estimated by applying other filters to each of the power dissipation values for the neighboring components. The estimated temperature of the selected component and the estimated cross-coupling temperatures for each of the neighboring components can then be added to thereby estimate the operating temperature for the selected component. Further, the operation of the system may be adjusted if the operating temperature determined for the selected component exceeds a threshold value.

20 Claims, 4 Drawing Sheets

SYSTEMS AND METHODS FOR ESTIMATING TEMPERATURES OF POWER MODULE COMPONENTS

TECHNICAL FIELD

This document generally relates to power modules such as those used in hybrid and electric vehicles. More particularly, this document describes systems and methods for estimating the temperature of components used in power modules during operation of the vehicle.

BACKGROUND

In recent years, so-called "hybrid vehicles" have become increasingly popular. These vehicles typically supplement the power produced by a more-conventional internal combustion engine with power generated by one or more electric motors, thereby dramatically reducing fuel consumption without significant effects upon the driving experience.

Despite the success of hybrid and electric vehicles, however, various design and performance challenges remain. For example, thermal issues often arise within power module circuits associated with electric motors because the various components (e.g. transistors, diodes) present within the inverter circuit tend to dissipate heat energy at uneven rates, particularly at low fundamental operating frequencies. Typically, it is desirable to avoid overheating the various components in the power module to prevent damage. While many power module controllers implement some sort of thermal protection, this is typically based upon an internally-mounted thermistor and/or average heat dissipation over a period of the fundamental output of the module. Such techniques generally assume that the frequency of the output is high relative to a thermal time-constant of the component so that the device temperature is averaged over time. At very low frequency operation (e.g., very low speed or standstill conditions), however, this averaging assumption may not hold, thereby leading to inaccurate temperature estimations. Inaccurate estimation could potentially lead to undesirable overloading of one or more components of the system, which could, over time, result in reduced reliability of such components.

Accordingly, it is desirable to provide improved systems and techniques for estimating thermal conditions of components within the power module system. In particular, it is desirable to create systems and techniques that provide accurate temperature estimation even at relatively low fundamental operating frequencies (such as zero hertz). Furthermore, other desirable features and characteristics of the present invention will become apparent from the subsequent detailed description and the appended claims, taken in conjunction with the accompanying drawings and the foregoing technical field and background.

SUMMARY

According to various exemplary embodiments, methods and systems are provided for modeling temperature characteristics of components in a system such as a power module for a hybrid or electric vehicle. A power dissipation value is calculated for each of the components in the system. A first filter is applied to the power dissipation value associated with a selected component to determine its estimated temperature. For each of the neighboring components located adjacent to the selected component, a cross-coupling temperature is estimated by applying other filters to each of the power dissipation values for the neighboring components. The estimated temperature of the selected component and the estimated cross-coupling temperatures for each of the neighboring components can then be added to thereby estimate the operating temperature for the selected component. Further, the operation of the system may be adjusted if the operating temperature determined for the selected component exceeds a threshold value.

Other embodiments relate to methods of operating a power module comprising a plurality of components in a vehicle. A power dissipation value for each of the plurality of components is calculated, and a first filter is applied to the power dissipation value associated with a selected one of the plurality of components to determine an estimated temperature of the selected component. For each of a plurality of neighboring components located adjacent to the selected component, a cross-coupling temperature for the neighboring component is estimated by applying a filter associated with the neighboring component to the power dissipation value for the neighboring component. The estimated temperature of the selected component and the estimated cross-coupling temperatures for each of the neighboring components are added to thereby estimate the operating temperature for the selected component. The operation of the power module can be adjusted if the operating temperature determined for the selected component exceeds a threshold value.

Still other embodiments relate to a power module for a vehicle, the power module comprising a plurality of electrical components and a controller coupled to each of the plurality of components. The controller is configured to calculate a power dissipation value for each of the plurality of components, and to apply a first filter to the power dissipation value associated with a selected one of the plurality of components to determine an estimated temperature of the selected component. The controller is further configured to estimate, for each of a plurality of neighboring components located adjacent to the selected component, a cross-coupling temperature for the neighboring component by applying a filter associated with the neighboring component to the power dissipation value for the neighboring component, and to add the estimated temperature of the selected component and the estimated cross-coupling temperatures for each of the neighboring components to thereby estimate the operating temperature for the selected component. The operation of the power module can be adjusted by the controller if the operating temperature determined for the selected component exceeds a threshold value.

Other features and aspects of various embodiments are described in additional detail below.

DESCRIPTION OF THE DRAWINGS

The subject matter will hereinafter be described in conjunction with the following drawing figures, wherein like numerals denote like elements.

DETAILED DESCRIPTION

The following description relates primarily to methods and systems associated with power modules such as those found on many hybrid and electrical automobiles, trucks and other vehicles. Equivalent concepts, however, may be readily applied in other vehicular, industrial, aerospace and/or other settings. In this regard, the following detailed description is merely exemplary in nature and is not intended to limit the invention or the application and uses of the invention. Furthermore, there is no intention to be bound by any expressed or implied theory presented in the preceding technical field, background, brief summary or the following detailed description.

Generally speaking, the temperatures of various components operating in a system can be accurately estimated by applying a filter-based model of temperature behavior to calculated power dissipation values. That is, power dissipation values for one or more components can be calculated based upon known data. These calculated values can then be filtered, with the results added as appropriate to arrive at accurate estimations of component temperatures. By applying an appropriate set of filters, temperature estimations at even low fundamental frequencies can be much more accurate than those based upon prior art averaging techniques.

The following description refers to elements or nodes or features being "connected" or "coupled" together. As used herein, unless expressly stated otherwise, "connected" means that one element/node/feature is directly joined to (or directly communicates with) another element/node/feature in a mechanical, logical, electrical or other appropriate sense. Likewise, unless expressly stated otherwise, "coupled" means that one element/node/feature is directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment of the invention.

Figure 1:
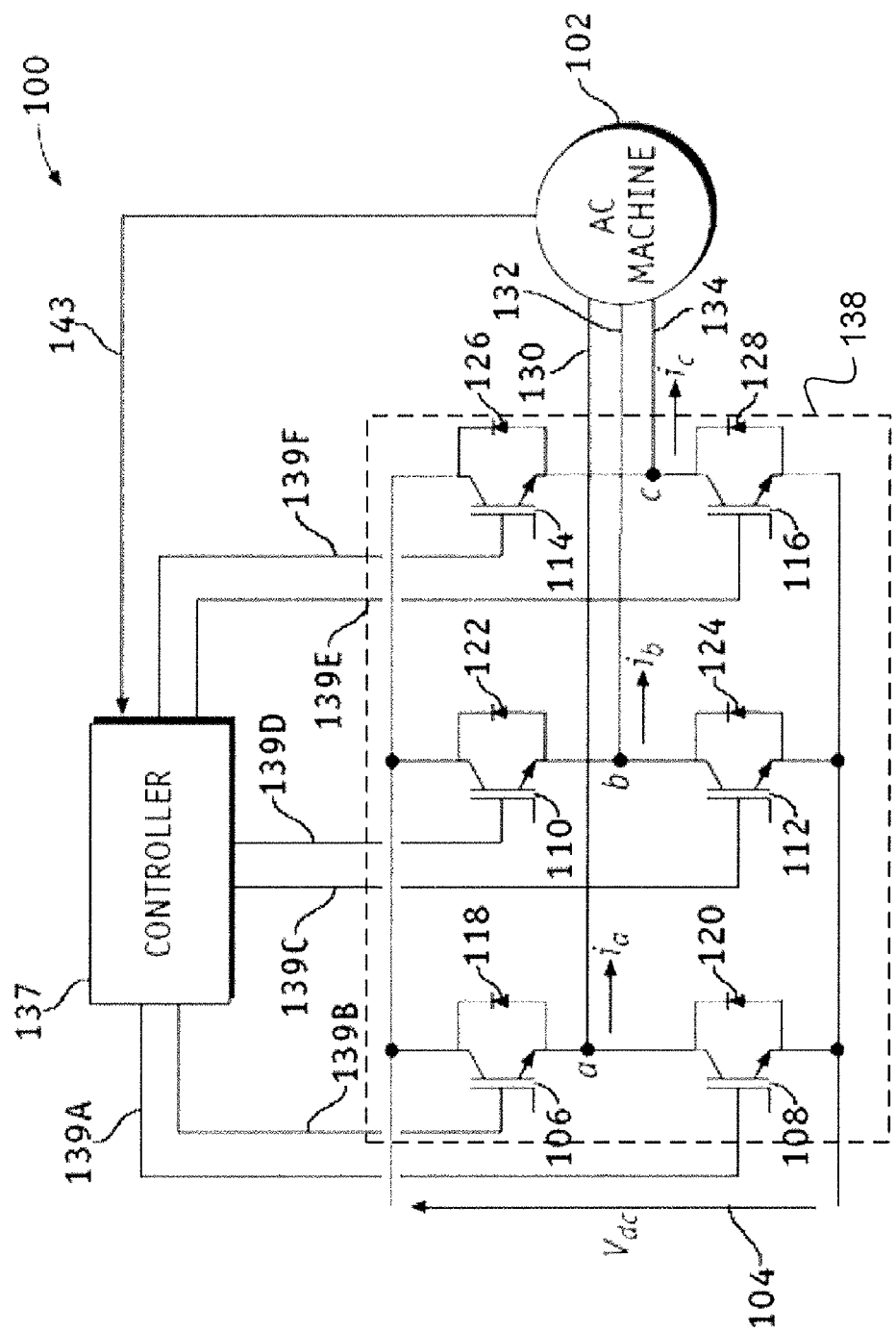
FIG. 1 is a circuit diagram of an exemplary power module for a vehicle.

With reference now to the drawing figures and initial reference to FIG. 1, an exemplary system 100 suitable for use in an automobile, truck or other vehicle is shown. Such a system 100 could include any sort of DC-to-AC converter (or inverter), any sort of DC-to-DC converter, or the like. In the FIG. 1 example, system 100 is an inverter-type circuit that suitably applies the electrical energy from source 104 across the multiple electrical phases 130, 132, 134 of an electrical machine 102. This energy is typically applied in response to various pulse width modulation (PWM) or other control signals 139A-F generated by a digital controller 137 and provided to switching components within circuit 100 as appropriate. Many other types of systems 100 could be equivalently applied in automotive or other settings.

As shown in FIG. 1, system 100 includes an appropriate power module 138 that applies current to each of the three electrical phases 130, 132, 134 of AC machine 102 using three sets of switching elements, shown in FIG. 1 as switches 106-116. Switches 106 and 108 can be activated by signals 139A and 139B, respectively, to apply positive or negative current to phase 130, with switches 110 and 112 activated by signals 139C-D to apply positive or negative current to phase 132, and switches 114 and 116 activated by signals 139E-F to apply positive or negative current to phase 134, respectively. In various embodiments, switches 106-116 are implemented with insulated gate bipolar transistors (IGBTs), metal oxide semiconductor field effect transistors (MOSFETs), and/or the like. Such transistors typically provide a common terminal (e.g. a base or gate terminal) that can be driven with a control signal 139A-F to a relatively high or low voltage to thereby enable electrical conductivity between the remaining terminals of the device.

In the embodiment shown in FIG. 1, each switch 106-116 is shown configured in anti-parallel with a diode 118-128. Generally speaking, each diode conducts electrical current when its companion parallel switch is in an inactive state. The diode, however, carries current in the opposite direction that its companion switch carries. Diode 120, for example, typically conducts current when switch 108 is active, but not when switch 106 is active. Diode 118, conversely, typically conducts current while switch 106 is activated, but not when switch 108 is active. Switches 110, 112, 114 and 116 in the FIG. 1 embodiment are shown similarly paired with diodes 124, 122, 128 and 126, respectively. Generally speaking, a desired AC or DC voltage can be applied on any of the three phases 130, 132, 134 by adjusting the time durations that each switching element 106-116 remain active. Additional details of exemplary voltage source inverter circuits are described in U.S. Pat. No. 7,061,134, although many equivalent inverter, converter and/or other topologies and operating schemes could be used in other embodiments.

In many embodiments, switches 106-116 and diodes 118-128 making up power module 138 are implemented with integrated circuitry. That is, one or more of these components may be implemented with circuitry fabricated on one or more semiconductor dies and packaged in any manner. In some embodiments, multiple components may be provided on a common semiconductor substrate. Two or more switched 106-116 and/or diodes 118-128, for example, may be formed on a common die, substrate or the like. In computing temperature estimates, then, it may be helpful to consider the effects of temperature cross-coupling between closely-placed components (e.g., components located on the same substrate or die, or otherwise located in relatively close physical proximity) as operation of one component may produce heat that affects neighboring components.

Controller 137 is any device, module, circuitry, logic and/or the like capable of providing control signals 109A-F to the various components of inverter circuit 100. Controller 137 may be implemented with a conventional microprocessor or microcontroller, for example, which would typically include software or firmware instructions stored in volatile or non-volatile digital memory. In other embodiments, controller 137 is implemented with programmed gate arrays, look-up tables and/or other logic circuitry of any kind. Although not shown in FIG. 1, controller 137 may be physically coupled to switches 106-116 via any type of multiplexing/de-multiplexing or other decoding circuitry to reduce the number of logic pins or other outputs on controller 137 used to provide signals 139A-F. Further, controller 137 may receive any sort of input signal 143 from AC machine 102 or any sensor associated therewith to indicate the presence of a low frequency operating condition, as described more fully below.

Source 104 shown in FIG. 1 is any battery, generator, fuel cell or other source of electrical energy. Generally, the power source corresponds to a conventional hybrid vehicle battery or series of batteries providing direct current (DC) to system 100. In the exemplary embodiment of FIG. 1, source 104 is simply shown as a relative voltage (VDC) applied between two input terminals of inverter power module 138, which may be applied in any conventional manner.

AC machine 102 in FIG. 1 is any type of induction motor or the like having any number of inductive windings corresponding to any number of electrical phases. The embodiment of AC machine 102 shown in FIG. 1, for example, has three electrical phases, although equivalent embodiments could make use of two, four or any other number of inductive phases. AC machine 102 operates according to conventional electrical principles. By alternately connecting the various windings 130, 132, 134 to power source 104, for example, various electrical paths can be formed and altered as appropriate to generate mechanical torque applied to any number of wheels, flywheels or other mechanical loads.

In the embodiment shown in FIG. 1, each of the electrical phases 130, 132, 134 of power module 138 can be switchably coupled to either the positive or negative terminals of power source 104 by the various components of inverter circuit 100, thereby allowing either full rail voltage or zero voltage across any two of the phases 130, 132, 134 in either direction. Switches 106, 110 and 114, for example, switchably couple phases 130, 132, 134 (respectively) to the positive voltage (or primary) side of power source 104, while switches 108, 112, 116 couple phases 130, 132, 134 (respectively) to the opposite (e.g. negative or reference) side of power source 108. To apply a positive or negative voltage between any two of the phases 130, 132, 134, then, one or more switches 106-116 associated with the winding can be activated using one or more appropriate control signals 139A-F. To apply positive voltage during a time interval between phases 130 and 132, for example, phase 130 is coupled to the positive side of power source 104 (i.e. switch 106 is activated with signal 139B) and phase 132 is coupled to the negative side of power source 104 (i.e. switch 112 is activated with signal 139C). Current flow in the circuit depends on the polarity of the voltage applied and the power factor of the load connected. Hence, if the phase current in 130 has positive polarity (i.e. flows in the direction as shown in FIG. 1), it flows through the switch 106. Conversely, the current flows through the diode 118 if it has negative polarity. Similarly, the phase current in phase 132 will flow through either switch 112 or diode 124 depending on its negative or positive polarity respectively during that time interval.

As noted above, it is generally desirable to prevent any of the various components in power module 138 from overheating. This can be accomplished by estimating the temperature of one or more components, and then avoiding conditions that produce excessive heat, or otherwise reacting to high-heat conditions in an appropriate manner.

Figure 2:
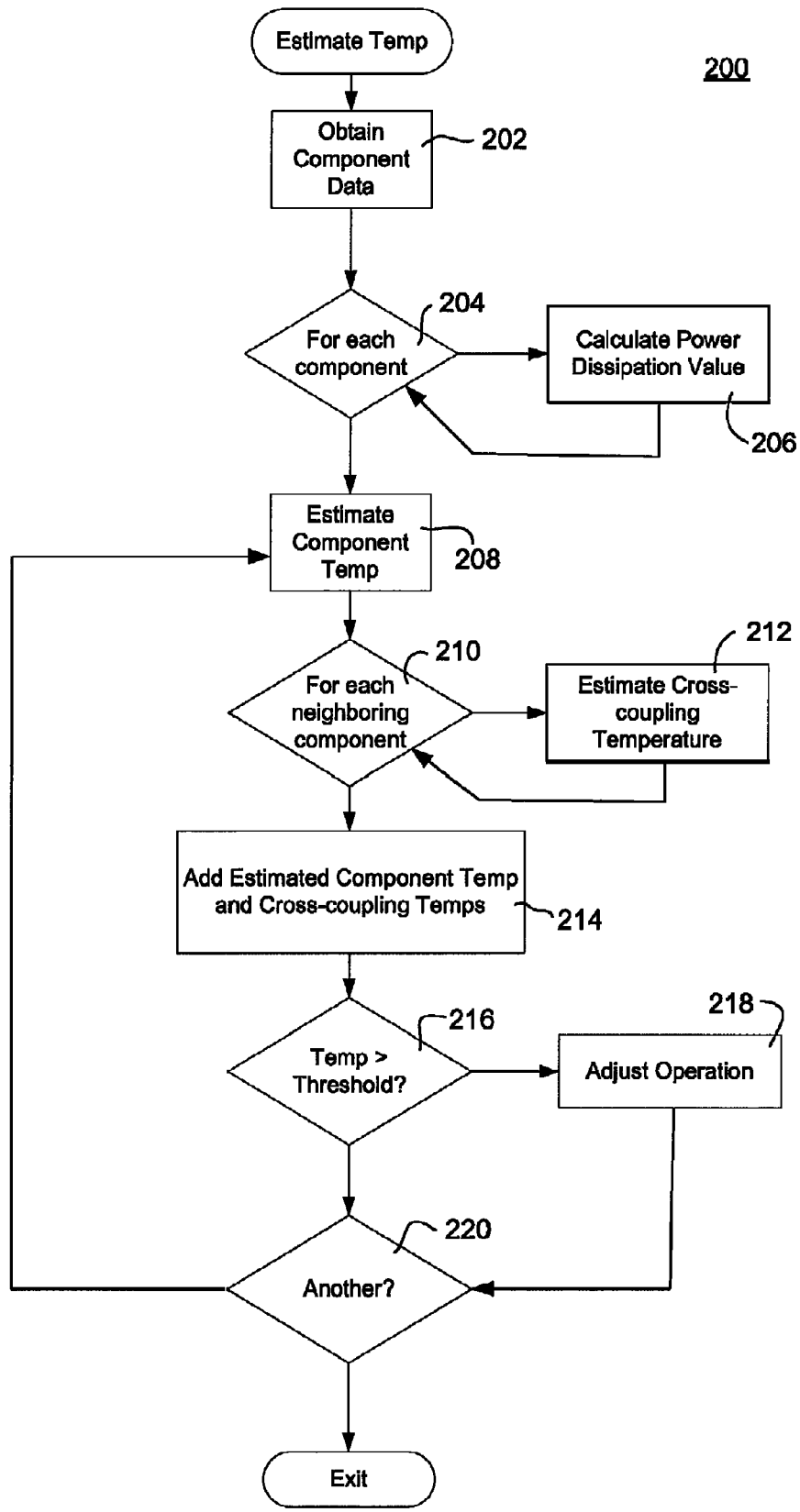
FIG. 2 is a flowchart showing an exemplary technique for estimating the temperature of one or more components in a system.

One technique for considering electro-thermal issues is shown in FIG. 2. Generally speaking, the various steps of technique 200 may be implemented with software or firmware instructions stored in any random access memory (RAM), read-only memory (ROM), flash memory, mass storage (e.g., any sort of magnetic or optical media), and/or other digital storage medium of any sort. Such instructions may be executed by any microprocessor or other controller (e.g., controller 137 in FIG. 1) in any manner. In various embodiments, method 200 is executed within a power module controller 137 in real time during operation of the vehicle to ensure that accurate temperature estimates are available for all relevant operating conditions and parameters. In other embodiments, however, technique 200 may be executed only when needed (e.g., during low frequency operation), with prior art or other techniques used during other conditions (e.g., higher frequency operation) to prevent undue demands on processing hardware or any other resources. As such, technique 200 may be executed (or not executed) at any time during operation of the vehicle and/or power module 138.

With reference now to FIG. 2, an exemplary technique 200 for estimating the temperature of one or more components in a system includes the broad steps of calculating power dissipation values for each of the components (steps 204, 206), estimating the temperature of a selected component (step 208) by applying a filter, estimating cross-coupling effects (steps 210, 212) for neighboring components, and then summing the estimated temperature and the temperature effects caused by cross-coupling (step 214) to arrive at an accurate temperature estimate for the selected component. Should this estimated temperature exceed an acceptable temperature for operation (step 216), then the operation of the power module can be adjusted (step 218) or another appropriate remedial action can be taken. The process of estimating component temperatures may be repeated for any number of selected components (step 220) as desired.

Generally speaking, then, the temperature estimation process involves determining power consumption values for each component, and then filtering the various power consumption values to arrive at estimated temperature parameters.

Power consumption may be determined in any manner. In various embodiments, data about each component is obtained from memory, mass storage and/or the like (step 202), and power dissipation is computed for each component (step 204) using conventional algebraic or other mathematical techniques (step 206). Generally speaking, power consumption may be considered to be a function of both conduction loss (e.g., loss due to the passage of electrical current through the device) and switching loss (e.g., loss due to current and voltage present while the device is switching states). These values can be determined using relatively simple algebraic techniques from empirical and/or readily-measurable data.

With momentary reference again to FIG. 1, for example, the power dissipation values for various components during a switching period can be readily computed from catalog and measurable data. As the current 130 ($i_a$) is positive (as shown in FIG. 1), for example, and switch 106 is conducting the current 130, the power dissipation in switch 106 can be shown to be the product of the saturation voltage ($V_{sat}$) of switch 106 (which is itself a function of current 130), the actual current 130 ($i_a$), and the duty cycle (d) of the applied modulation. Stated algebraically:

$$P_{cond\_s1} = V_{sat}(i_a) \cdot i_a \cdot d \tag{1}$$

When current 130 ($i_a$) is positive and diode 120 is conducting the current 130, the power dissipation in diode 120 can be shown to be the product of the voltage drop ($V_D$) of diode 120 (which is a function of current 130), the actual current 130 ($i_a$), and the remaining duty cycle (1−d) of the applied modulation. Stated algebraically:

$$P_{cond\_d2} = V_D(i_a) \cdot i_a \cdot (1-d) \tag{2}$$

Similarly, when the current 130 ($i_a$) is negative (as shown in FIG. 1), the power dissipation in switch 108 can be shown to be:

$$P_{cond\_s2} = V_{sat}(i_a) \cdot i_a \cdot (1-d) \tag{3}$$

and the power dissipation in diode 118 can be shown to be:

$$P_{cond\_d1} = V_D(i_a) \cdot i_a \cdot (d) \tag{4}$$

Switching losses can be similarly shown to be functions of catalog data and/or readily determinable quantities. The switching losses in switches 106 and 108, for example, can be determined algebraically from the turn-on and turn-off energies of the switch ($E_{on}$ and $E_{off}$, respectively), the switch period ($T_s$), and the ratio of the actual DC bus voltage value ($V_{DC}$) to the standard DC bus value ($V_{DC\_test}$) at which the turn-on and turn-off energies are measured by the switch manufacturer. Stated algebraically:

$$P_{SW} = (E_{on}(i_a) + E_{off}(i_a)) \cdot T_s \cdot \frac{V_{DC}}{V_{DC\_test}} \quad (5)$$

Similarly, the switching losses in diodes 118 and 120 can be determined from the reverse recovery energy ($E_{rr}$) of the diode, the switching period ($T_s$), and the ratio of the actual DC bus voltage value ($V_{DC}$) to the standard DC bus value ($V_{DC\_test}$). Hence, for diodes in this embodiment of power module 138, switching losses may be expressed as:

$$P_{SW} = E_{rr}(i_a) \cdot T_s \cdot \frac{V_{DC}}{V_{DC\_test}} \quad (6)$$

Note that in each of the above relationships, the saturation voltage ($V_{sat}$), diode voltage drop ($V_D$), the turn-on and turn-off energies ($E_{on}$ and $E_{off}$, respectively) and the reverse recover energy of the diodes ($E_{rr}$) are each expressed as functions of current 130 ($i_a$). Each of these functions are relatively static and may be generally well-described in product literature or other sources. Moreover, these values do not typically change substantially due to temperature or factors other than the applied current. Hence, a look-up table or the like can be supplied (e.g., in step 202 or elsewhere) that allows for these values to be determined for various values of applied current.

The general concepts set forth above can be applied in any number of settings to any sort of power module or other system. The equations above may be readily adapted for any of the switches 106-116 and/or diodes 118-128 in FIG. 1, for example, or to any other components in this or any other embodiment. Further, in embodiments wherein multiple chips or other devices are used to implement any particular switch, diode or other component, the power consumption value may be readily divided or otherwise adjusted to compensate for the multiple chips, dies or other components that are dissipating the energy of the feature. Many different techniques for computing power dissipation values may be formulated and applied to any sort of power module 138 or other system in any number of equivalent embodiments.

Returning now to FIG. 2, the various power dissipation values determined in step 206 may be filtered or otherwise processed to estimate temperature values for one or more components (step 208). In the exemplary embodiment shown in FIG. 2, an estimated temperature for any selected component is initially determined by applying an appropriate filter to the power dissipation value for the selected component. Typically, the applied filter will allow for accurate temperature estimates even at relatively low operating frequencies, as described more fully below. The particular filter that is applied may be designed in any manner based upon empirically-observed data and/or any other factors as appropriate. In various embodiments, one or more relatively low-order filters (e.g., a first order filter) may be applied to maintain the level of computation at a relatively low level. Higher order filters and/or multi-stage filters, however, may be equivalently applied in other embodiments.

The estimated temperature obtained in step 208 may be made more accurate by considering cross-coupling effects from neighboring components, as shown in steps 210 and 212. "Neighboring components" refers to any other components that are in close enough physical proximity such that thermal cross-coupling or other thermal effects may apply. Neighboring components may reside on the same substrate or die in some embodiments, for example, whereas neighboring components may simply be located in close physical proximity (yet on separate dies, substrates or packages) in other embodiments.

For each of the components that are to be considered (step 210), cross-coupling effects are estimated in any manner (step 212). In various embodiments, cross-coupling temperatures are estimated using the same filtering techniques described above with respect to step 208. That is, a power dissipation value for the neighboring component may be applied to a filter to arrive at a suitable estimate of the effect produced by the component. The particular filter may be different from that applied in step 208, although overlapping or identical filters may be applied in some embodiments and cases. The numerical value that results from the cross-coupling filter may be scaled or otherwise adjusted to account for physical difference in some embodiments, although other embodiments may simply ignore such factors or incorporate them into the parameters of the particular filter or model applied, as appropriate.

The estimated component temperature and the estimated cross-coupling temperature effects for any neighboring components may be added or otherwise combined (step 214) to arrive at a suitable temperature estimate for the selected component. The resulting estimate will generally be accurate even at relatively low operating frequencies, and will typically be more accurate than estimates obtained from prior art averaging techniques.

The resulting temperature estimate for the selected component may be output or otherwise processed in any manner. In various embodiments, the temperature estimate is used to identify when one or more components may be operating at a temperature that exceeds a threshold of reliable operation (step 216). For example, if a component is estimated to be operating beyond its normal thermal constraints, it may be desirable to identify such conditions and take appropriate remedial action (step 218). Remedial action may involve adjusting a supply voltage provided to the component, for example, or otherwise adjusting the operation of the system to reduce the thermal effects upon the component of interest. For example, signals 139A-F may be adjusted as appropriate to change the operation the circuit when thermal conditions warrant. Other types of outputting that could take place include logging temperature data for subsequent retrieval (e.g., for maintenance purposes), providing the estimated temperature to another module or routine operating within controller 137, providing any sort of indicia to a driver or maintenance worker associated with the vehicle, and/or taking any other actions as appropriate.

Figure 3:
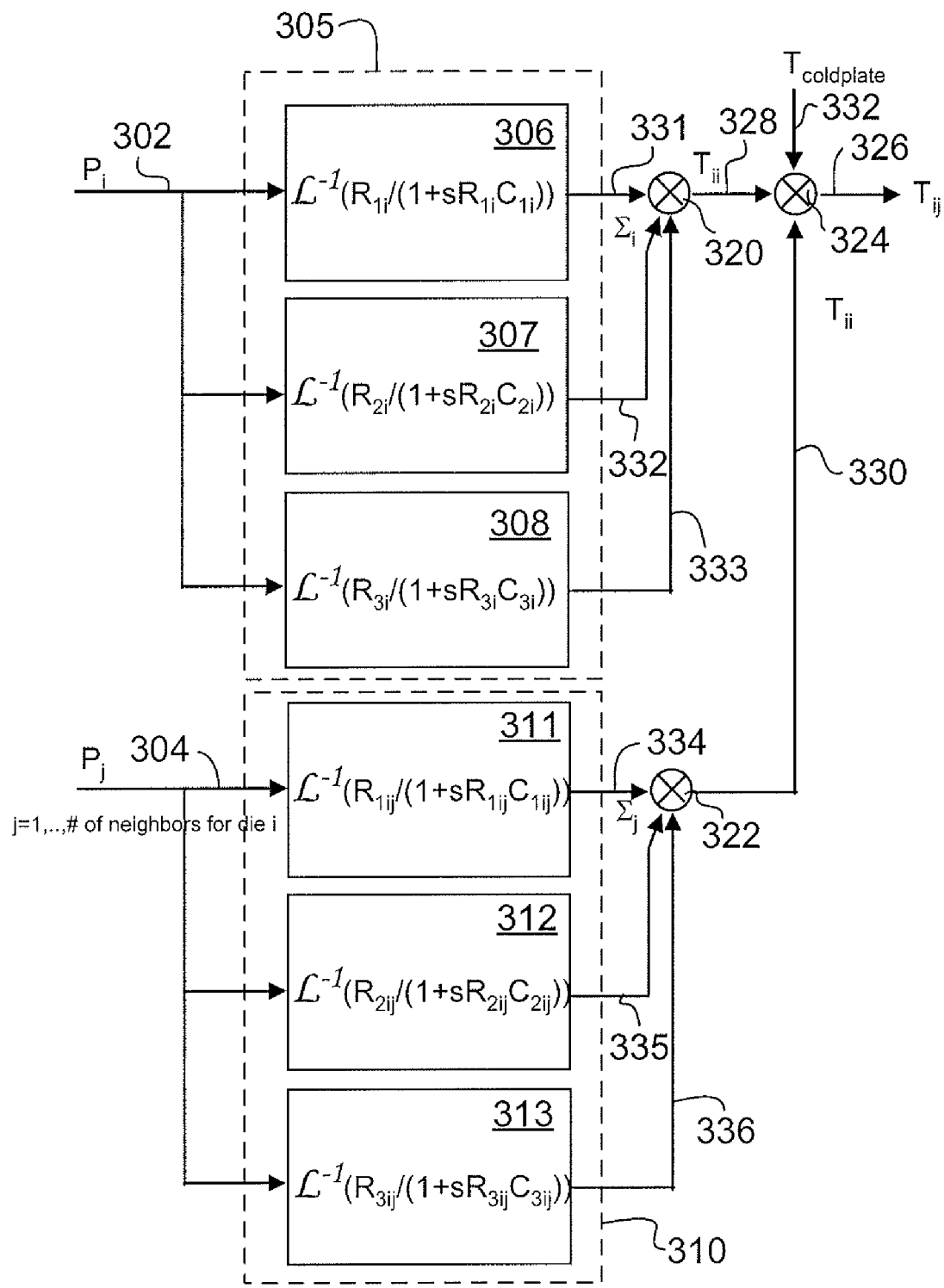
FIG. 3 is a block diagram showing an exemplary filter arrangement.

FIG. 3 shows a block diagram that provides additional detail about an exemplary filtering technique that may be applied, for example, in steps 208 and 212 above. With reference now to FIG. 3, various filters 305, 310 may be applied to different components (e.g., switches, diodes and the like) operating within a system to arrive at estimated values of component and cross-coupling temperatures, respectively. Filter 310 may be repeated any number of times for any number of additional components neighboring the component of interest. As shown in FIG. 3, each filter 305, 319 includes any number of filter stages to improve the accuracy and resolution of the filter. Filter 305 includes three filter stages 306-308, for example, whereas filter 310 includes filter stages 311-313. Different embodiments may use different numbers of filter stages for estimating component and/or cross-coupling temperatures, as appropriate. Typically, additional filter stages may increase the amount of computation involved, so it may be desirable to use fewer filter stages in computing cross-coupling temperatures, for example, than component temperatures. In other embodiments, each component has an associated filter 305, 310 that may be used to compute both component temperatures and to derive cross-coupling temperatures (e.g., in conjunction with a scaling constant or the like to reflect distance between neighboring components).

In operation, the power dissipation value 302 calculated for a selected component is applied to the various stages 306, 307, 308 of filter 305 to obtain any number of resultant values 331, 332, 333 (respectively). These resultant values 331-333 may be summed or otherwise combined 320 to arrive at the estimated temperature 328 for the selected component. Similarly, the power dissipation values 304 for any number of neighboring components may be applied to filter stages 311, 312, 313 associated with the neighboring component to arrive at resultant values 334, 335, 336 (respectively). These resultant values may be summed 322 or otherwise processed to arrive at one or more estimated cross-coupling temperatures 330. Estimated temperature 328 and cross-coupling temperatures 330 may then be added (element 324, which corresponds to step 214 in FIG. 2) or otherwise combined as desired. In various embodiments, an offset temperature (such as an ambient or "coldplate" temperature 332 measured from an appropriate sensor) may be added as well to arrive at the temperature 326 for the selected component. That is, estimated temperature 326 can be determined by considering the heating effects of the component itself and its neighbors, and then adding the temperature increase due to these effects to the baseline or ambient temperature 332.

As noted above, each filter 305, 310 may include any number of stages 306-308, 311-313 as appropriate. As shown in FIG. 3, each stage 306-308, 311-313 is represented by a first order filter expressed by a Laplace equation that incorporates any number of parameters. Each filter stage shown includes resistive (R) and capacitive (C) thermal constants, for example, that together provide a time constant (RC) for the applied filter. In practice, the particular parameters for each filter stage may be determined in any manner, such as from observed data.

Figure 4:
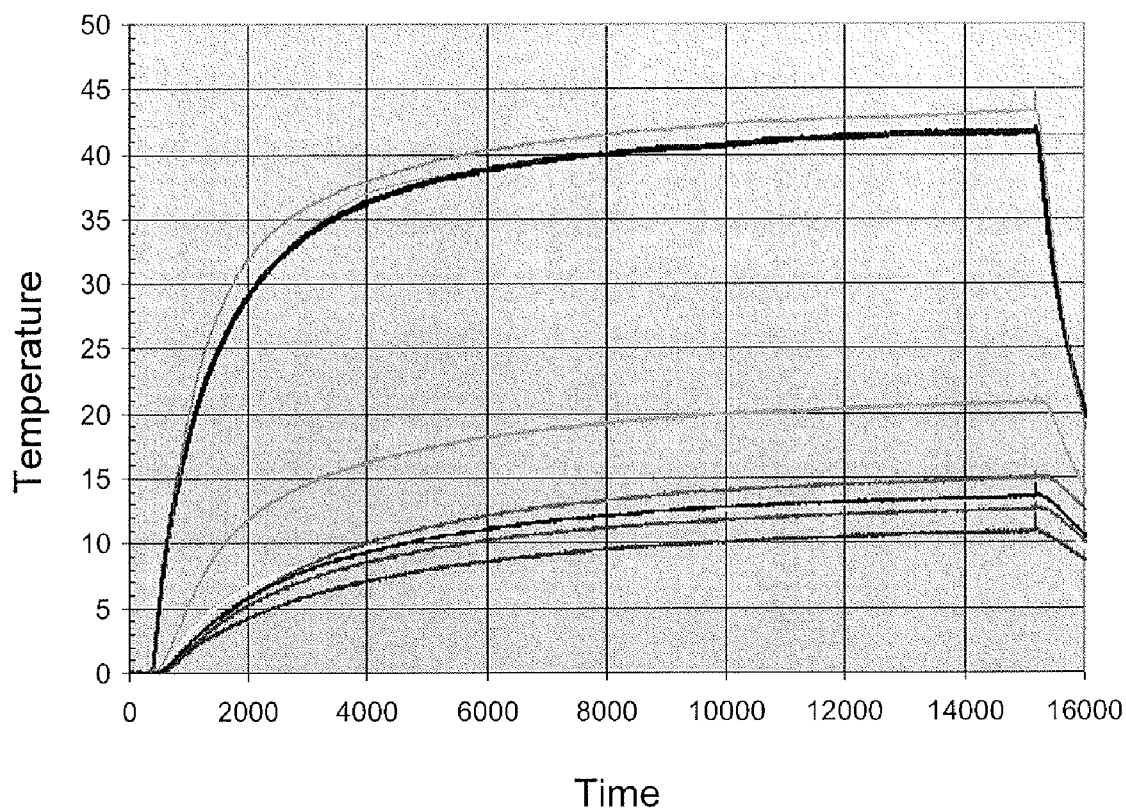
FIG. 4 is a plot showing exemplary temperature characteristics over time for a number of components.

FIG. 4, for example, shows a plot of observed temperature behavior for various components over time. As noted in FIG. 4, the temperature of each component generally rises in an exponential manner with time toward a steady state operating temperature. This behavior can be readily modeled using the constructs described above. Using conventional systems analysis techniques, values of "R" and "C" for each filter stage 306-308 and 311-313 can be determined to reflect the observed behavior of each component over time. Converting the model to the frequency domain using conventional Laplace, Fourier or other analysis (e.g., as shown in FIG. 3), these parameters can be similarly used to model system performance in a suitable manner. In contrast to prior art techniques, then, a model can be applied to arrive at very accurate temperature estimations, even during low frequency operation of the system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A method of modeling an operating temperature for a selected one of a plurality of components in a system, the method comprising:

for each of the plurality of components, calculating a power dissipation value for the component;

applying a first filter to the power dissipation value associated with the selected component to obtain an estimated temperature of the selected component;

for each of a plurality of neighboring components located adjacent to the selected component, determining an estimated cross-coupling temperature for the neighboring component by filtering the power dissipation value for the neighboring component;

adding the estimated temperature of the selected component and the estimated cross-coupling temperatures for each of the neighboring components to thereby determine the operating temperature for the selected component; and outputting the determined operating temperature for the selected component.

2. The method of claim 1 wherein the outputting comprises adjusting a supply voltage provided to the selected component if the operating temperature determined for the selected component is above a threshold value.

3. The method of claim 1 wherein the determining step comprises applying at least one cross-coupling filter different from the first filter to the power dissipation values for the neighboring components.

4. The method of claim 3 wherein the first filter and each of the at least one cross-coupling filters are first order filters.

5. The method of claim 1 wherein the first filter is a first order filter having a plurality of parameters.

6. The method of claim 5 wherein the parameters are selected based upon experimental data.

7. The method of claim 1 wherein the first filter comprises a plurality of filter stages, and wherein the estimated temperature comprises summed outputs from each of the plurality of filter stages.

8. The method of claim 7 wherein each of the filter stages is a first order filter having experimentally-determined parameters.

9. The method of claim 1 wherein the power dissipation values for each component are calculated based upon a conduction loss and a switching loss.

10. The method of claim 1 wherein the power dissipation values for each component are averaged over a switching period of the system.

11. The method of claim 1 further comprising receiving an indication of a coldplate temperature, and wherein the adding comprises adding the coldplate temperature to the estimated temperature of the selected component and the estimated cross-coupling temperatures for each of the neighboring components.

12. A method of operating a power module in a vehicle, wherein the power module comprises a plurality of components, the method comprising:

calculating a power dissipation value for each of the plurality of components;

applying a first filter to the power dissipation value associated with a selected one of the plurality of components to determine an estimated temperature of the selected component;

for each of a plurality of neighboring components located adjacent to the selected component, estimating a cross-coupling temperature for the neighboring component by applying a filter associated with the neighboring component to the power dissipation value for the neighboring component;

adding the estimated temperature of the selected component and the estimated cross-coupling temperatures for each of the neighboring components to thereby estimate the operating temperature for the selected component; and adjusting the operation of the power module if the operating temperature determined for the selected component exceeds a threshold value.

13. The method of claim 12 wherein the adjusting comprises adjusting a supply voltage provided to the selected component.

14. The method of claim 12 wherein the first filter and the filters associated with each of the neighboring components comprise a plurality of independent parameters.

15. The method of claim 14 wherein the independent parameters are derived from experimental data.

16. The method of claim 12 wherein the first filter and the filters associated with each of the neighboring components each comprise a plurality of first order filter stages each applying a different set of parameters to the applied power dissipation values.

17. A power module for a vehicle, the power module comprising a plurality of electrical components and a controller coupled to each of the plurality of components, wherein the controller is configured to:

calculate a power dissipation value for each of the plurality of components;

apply a first filter to the power dissipation value associated with a selected one of the plurality of components to determine an estimated temperature of the selected component;

for each of a plurality of neighboring components located adjacent to the selected component, estimate a cross-coupling temperature for the neighboring component by applying a filter associated with the neighboring component to the power dissipation value for the neighboring component;

add the estimated temperature of the selected component and the estimated cross-coupling temperatures for each of the neighboring components to thereby estimate the operating temperature for the selected component; and adjust the operation of the power module if the operating temperature determined for the selected component exceeds a threshold value.

18. The power module of claim 17, wherein each of the components comprise a semiconductor die.

19. The power module of claim 17 wherein the controller is configured to adjust the operation of the power module if the operating temperature determined for the selected component is above the threshold value by adjusting a voltage supplied to the selected component.

20. The power module of claim 17 wherein the first filter and the filters associated with each of the neighboring components each comprise a plurality of first order filter stages each applying a different set of parameters to the applied power dissipation values.

\* \* \* \* \*